United States Patent
Hayashi et al.

(10) Patent No.: US 9,103,645 B2
(45) Date of Patent: Aug. 11, 2015

(54) MEASURING INSTRUMENT

(71) Applicant: MITUTOYO CORPORATION, Kawasaki, Kanagawa (JP)

(72) Inventors: Nobuyuki Hayashi, Kawasaki (JP); Yoshiaki Shiraishi, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 249 days.

(21) Appl. No.: 13/765,955

(22) Filed: Feb. 13, 2013

(65) Prior Publication Data

US 2013/0232802 A1 Sep. 12, 2013

(30) Foreign Application Priority Data

Mar. 8, 2012 (JP) ................................ 2012-051944

(51) Int. Cl.
*G01B 3/22* (2006.01)
*G01B 5/00* (2006.01)
*G01B 21/04* (2006.01)

(52) U.S. Cl.
CPC ................ *G01B 5/00* (2013.01); *G01B 21/047* (2013.01)

(58) Field of Classification Search
USPC .............. 33/501, 501.08, 783, 787, 792, 794, 33/813, 819, 832
See application file for complete search history.

(56) References Cited

U.S. PATENT DOCUMENTS

| | | | |
|---|---|---|---|
| 6,286,227 B1 | 9/2001 | Corby, Jr. | |
| 8,065,807 B2 * | 11/2011 | Rucinski | 33/265 |
| 8,448,344 B2 * | 5/2013 | Mo | 33/507 |
| 2003/0188446 A1 * | 10/2003 | Mellander | 33/555.1 |
| 2009/0106994 A1 | 4/2009 | Gomez et al. | |
| 2011/0169754 A1 * | 7/2011 | Miyazawa et al. | 33/1 PT |
| 2011/0302796 A1 * | 12/2011 | Schubert | 33/366.11 |
| 2013/0091720 A1 * | 4/2013 | Hayashida | 33/819 |
| 2013/0305551 A1 * | 11/2013 | Jayanetti et al. | 33/701 |
| 2014/0237833 A1 * | 8/2014 | Schubert et al. | 33/365 |
| 2014/0293293 A1 * | 10/2014 | Vodnick et al. | 33/533 |

FOREIGN PATENT DOCUMENTS

| | | |
|---|---|---|
| EP | 1 745 741 A1 | 1/2007 |
| GB | 2 107 046 A | 4/1983 |
| GB | 2 415 878 A | 1/2006 |
| JP | A-2003-344002 | 12/2003 |
| JP | A-2003-344003 | 12/2003 |
| WO | WO 01/55667 A1 | 8/2001 |

* cited by examiner

*Primary Examiner* — G. Bradley Bennett
(74) *Attorney, Agent, or Firm* — Oliff PLC

(57) ABSTRACT

To provide a measuring instrument having improved usability and viewability. A measuring instrument includes a touch panel display unit that receives an external input performed by physical contact and has a display function. In the touch panel display unit, a plurality of operation icons that are used to perform a complicated input operation as well as a measurement result are displayed. It is possible to provide a measuring instrument that is superior in terms of the usability and viewability. For example, a measurement mode can be selected by selecting and touching one of the plurality of operation icons displayed in the touch panel display unit.

10 Claims, 26 Drawing Sheets

| CALCULATION COEFFECIENT | (1) D=AX | (2) D=AX+B | (2) H=AX+B | (4) R=AX | (5) R=AX+B+CX⁻¹ | (6) R=AX+B+CX⁻¹ |
|---|---|---|---|---|---|---|
| A | $-2\tan\dfrac{\theta}{2}$ | $-2\tan\dfrac{\theta}{2}$ | $-1$ | $-\dfrac{\sin\dfrac{\theta}{2}}{1-\sin\dfrac{\theta}{2}}$ | $\dfrac{1}{2}$ | $-\dfrac{1}{2}$ |
| B | 0 | $2r\left(\dfrac{1}{\cos\dfrac{\theta}{2}}-\tan\dfrac{\theta}{2}\right)$ | $r\left(\dfrac{1}{\sin\dfrac{\theta}{2}}-1\right)-\dfrac{d}{2\tan\dfrac{\theta}{2}}$ | 0 | $-r$ | $r$ |
| C | 0 | 0 | 0 | 0 | $\dfrac{L^2}{2}$ | $-\dfrac{L^2}{2}$ |

Fig. 7

MEASURING INSTRUMENT

INCORPORATION BY REFERENCE

This application is based upon and claims the benefit of priority from Japanese patent application No. 2012-051944, filed on Mar. 8, 2012, the disclosure of which is incorporated herein in its entirety by reference.

BACKGROUND OF THE INVENTION

1. Field of the Invention

The present invention relates to a measuring instrument. In particular, the present invention relates to a measuring instrument equipped with a touch panel.

2. Description of Related Art

Various electronic measuring instruments for measuring a distance, a length, an angle, and so on, have been known. Examples of such measuring instruments include a vernier caliper, a micrometer, a dial gauge (Japanese Unexamined Patent Application Publications No. 2003-344003, No. 2003-344002, and International Patent Publication No. WO01/055667). Because of demands for high functionalities, such measuring instruments have started to have various functions. While they are becoming more and more useful, various problems have been occurring.

Conventionally, an electronic measuring instrument is equipped with mechanical push-button-type switches. However, since the size of small tools such as a vernier caliper and a micrometer is restricted, it is difficult to increase the number of mechanical switches.

On the other hand, if various functions are to be selected and/or operated by using a small number of switches, users are forced to perform a complicated operation. For example, different switch operations need to be prepared for respective functions and/or measurement modes by combining sequences and/or durations with which switches are pushed (e.g., long press of switches) in various ways. It is troublesome for uses to memorize such complicated sequences and/or push switches exactly as instructed, and thus leading to the deterioration in the measurement efficiency. Therefore, the functions to be incorporated into a measuring instrument have to be restricted based on the size and the usability of the measuring instrument.

Further, when mechanical switches are provided, it is necessary to prepare holes for mounting the switches. As a result, it becomes difficult to ensure liquid-tight property. Further, if pickings are provided to maintain the liquid-tight property, the cost increases. Further, when push buttons are disposed on the surface, it causes another problem that the overall thickness increases.

Further, if space for mounting switches is secured on the surface of a small measuring instrument, it causes another problem that the space for disposing the display unit becomes smaller.

SUMMARY OF THE INVENTION

A measuring instrument according to an aspect of the present invention is characterized in that the measuring instrument includes a touch panel display unit that receives an external input performed by physical contact and has a display function.

In an aspect of the present invention, the touch panel display unit preferably displays a plurality of operation icons that are used to perform a complicated input operation, and also displays a measurement result.

In an aspect of the present invention, it is preferable that:
a plurality of measurement modes are prepared in advance according to a difference of an object to be measured or a difference of a measurement method;
the plurality of operation icons, each corresponding to a respective one of the plurality of measurement modes, are prepared; and
a choice among the plurality of measurement modes can be made by selecting and touching at least one of the plurality operation icons displayed in the touch panel display unit.

In an aspect of the present invention, it is preferable that:
a plurality of measurement modes are prepared in advance according to a difference of an object to be measured or a difference of a measurement method; and
the plurality of operation icons are grouped and hierarchized for each of the measurement modes, and a group of operation icons corresponding to a selected measurement mode are displayed in a mode select menu screen of the touch panel display unit.

In an aspect of the present invention, it is preferable that a direction of a display in the touch panel display unit can be changed according to a direction in which a user uses the measuring instrument.

In an aspect of the present invention, a number of mechanical push button switches provided in the measuring instrument is preferably equal to or less than one.

In an aspect of the present invention, the measuring instrument preferably does not have any mechanical push button switch.

In an aspect of the present invention, the measuring instrument preferably further includes a solar cell.

In an aspect of the present invention, the measuring instrument is preferably one of a dial gauge, a vernier caliper, and a micrometer.

In an aspect of the present invention, the measuring instrument is preferably a height gauge.

With the configuration like this, since the touch panel display unit is adopted, it is possible to improve the operability and the viewability.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 7 is a table showing various arithmetic expressions according to measurement jigs;

DESCRIPTION OF THE EXEMPLARY EMBODIMENTS

Exemplary embodiments according to the present invention are explained hereinafter with reference to the drawings.

[First Exemplary Embodiment]

As a first exemplary embodiment, a dial gauge 100 including a touch panel display unit is explained hereinafter.

Figure 1:
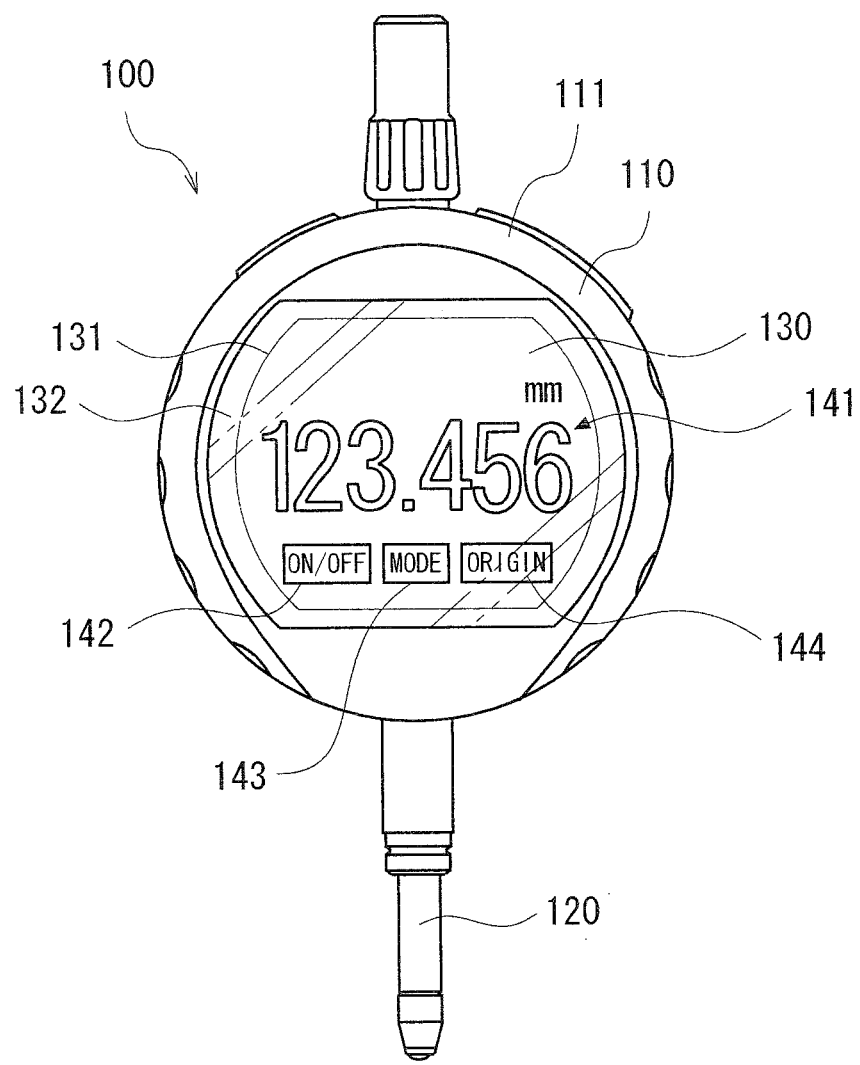
FIG. 1 is a front view of a dial gauge.

FIG. 1 is a front view of the dial gauge 100. The dial gauge 100 includes a housing unit 110, a spindle 120, and a touch panel display unit 130. The housing unit 110 has generally a cylindrical shape and includes a circular front plate 111, a circular rear plate, and a cylindrical side plate. (Note that since FIG. 1 is a front view, the rear plate and the side plate are not seen in the figure.)

By these front plate 111, rear plate, and side plate, space for housing an electronic circuit(s) is formed inside the housing unit 110.

The electronic circuit(s) may include an encoder for detecting the movement amount of the spindle 120, various arithmetic means, input detection means for detecting an input operation performed on the touch panel display unit 130, and display drive means for driving the display of the touch panel display unit 130. The spindle 120 penetrates the side plate of the housing unit 110 and is disposed in such a manner that the spindle 120 can move in the axis direction. The movement amount of the spindle 120 is detected by the encoder. Then, after various arithmetic processes are performed, the movement amount is displayed on the touch panel display unit 130.

The touch panel display unit 130 is disposed on the front plate 111 of the housing unit 110. As for the size of the transparent front plate 131 of the touch panel display unit 130, the transparent front plate 131 occupies about 80% or more of the area of the front plate 111. Even when the frame section 132 of the touch panel display unit 130 is excluded, the area that can be used for the display occupies 70% or more of the area of the front plate 111.

Further, the touch panel display unit 130 occupies almost all the area of the front plate 111, and any other component such as a push button is not disposed in the front plate 111. This is because since input operations are performed by touching the touch panel display unit 130, there is no need to use any mechanical push button for the operation.

(Display Direction Changing Operation)

Next, an example of an input operation using the touch panel display unit 130 and an example of display transition performed by an input operation are explained hereinafter.

Figure 2:
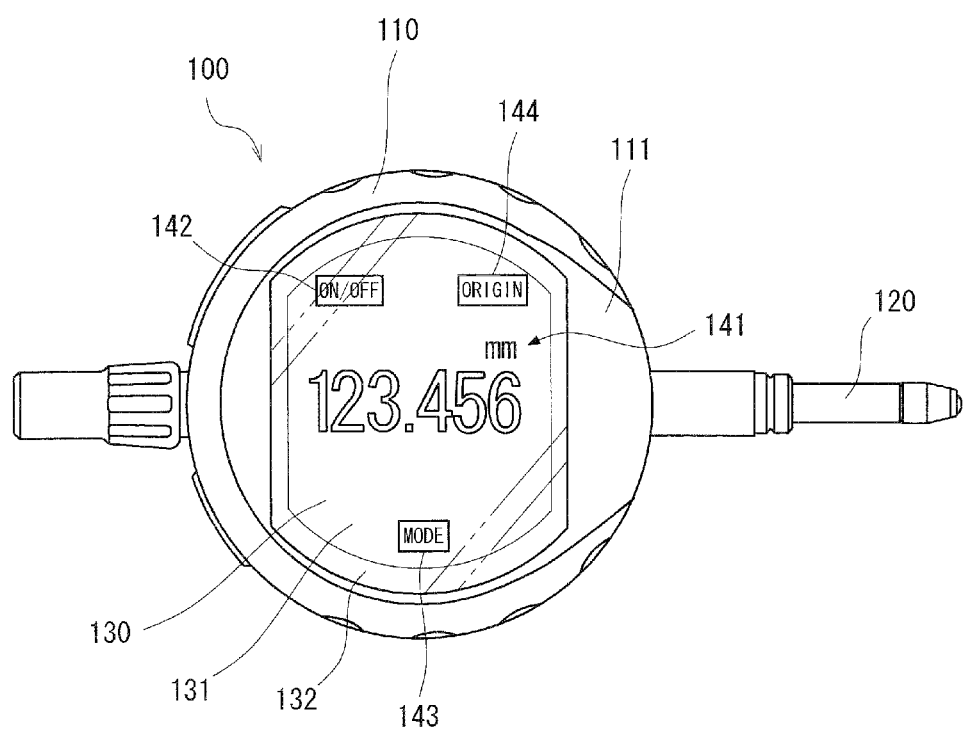
FIG. 2 shows a dial gauge in a horizontal used state.

In the state shown in FIG. 1, since the dial gauge 100 is used in the vertical direction, the display in the touch panel display unit 130 is also displayed in the vertical direction. It should be noted that small tools such as the dial gauge 100 are often used in various directions. For example, as shown in FIG. 2, there are situations where it is desirable to use the dial gauge 100 while orienting the dial gauge 100 itself in the horizontal direction. In such situations, the following input operation is performed in order to change the display direction.

Figure 3A:
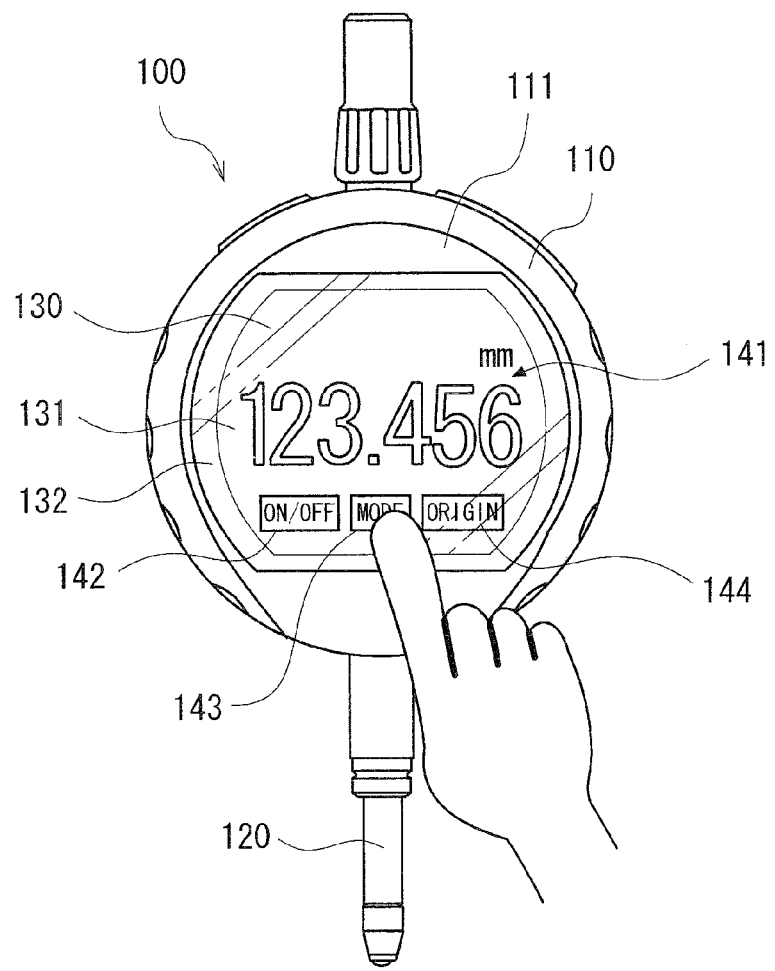
FIG. 3A is a figure for explaining an operation for changing the display direction.

FIG. 3A shows a display state in a case where the dial gauge 100 is used in the vertical direction. In the touch panel display unit 130, a measurement result 141 is displayed in the center in a large size. In addition, icons 142, 143 and 144 are also displayed. This display screen shown in FIG. 3A is referred to as "main display screen".

The main display screen is used when a measurement operation is performed, in which a measurement result 141 is displayed in the center. In this example, three icons 142, 143 and 144 are displayed in the lower section of the display area. That is, an ON/OFF icon 142 for a power supply operation, a MODE icon 143 for a mode selection, and an ORIGIN icon 144 for zero-setting are displayed.

Figure 3B:
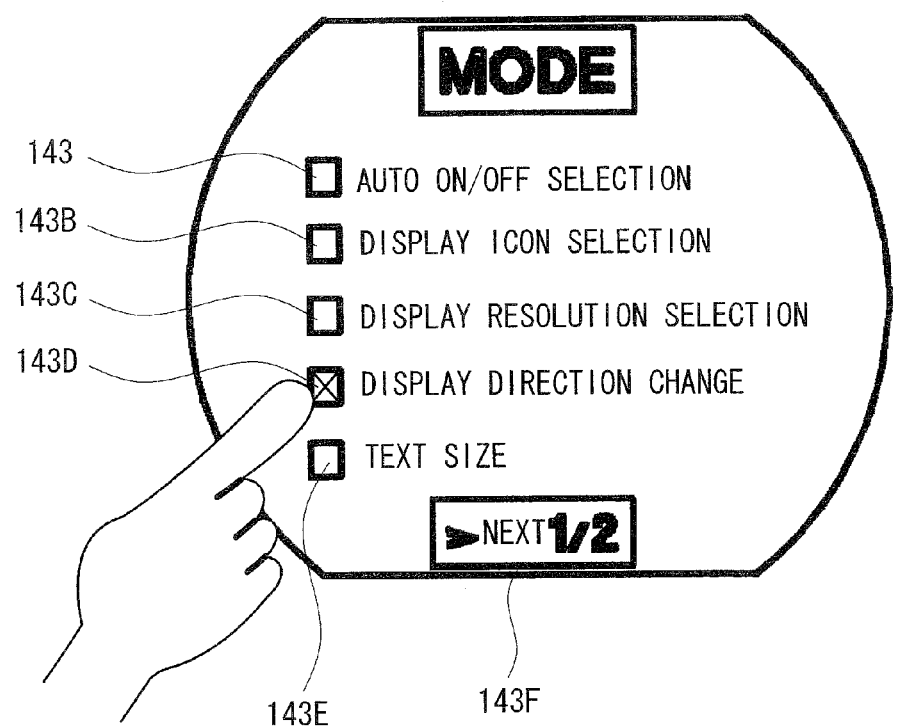
FIG. 3B is a figure for explaining an operation for changing the display direction.

In this state, the MODE icon 143 is touched in order to change the display screen. As a result, the display screen is changed to a mode select menu screen shown in FIG. 3B.

Various modes are prepared in the mode select menu screen. In this example, an Auto-ON/OFF selection 143A, a Display icon selection 143B, a Display resolution selection 143C, a Display direction change 143D, and a Text size selection 143E are prepared. When all the menu items cannot be displayed in one screen, a next screen(s) is prepared. Further, a next icon 143F for changing the screen is also prepared.

Then, "Display direction change" 143D is touched and thereby selected. As a result, as shown in FIG. 2, the display direction is changed from the vertical direction to the horizontal direction.

Since the touch panel display unit 130 is adopted and the display screen thereby becomes significantly larger in comparison to the conventional display screen, it is possible to display a measurement value(s) either in the vertical direction or in the horizontal direction. Further, since touch input operations by using the touch panel display unit 130 become possible, the operation for changing the display direction and the like becomes extremely easier.

(Display Icon Selecting Operation)

Further, although only three icons 142, 143 and 144 are displayed in the main display screen in FIG. 3A, there are cases where it is desirable, depending on the measurement situation, to display a much larger number of icons and thereby to use various functions during a measurement operation.

Figure 4A:
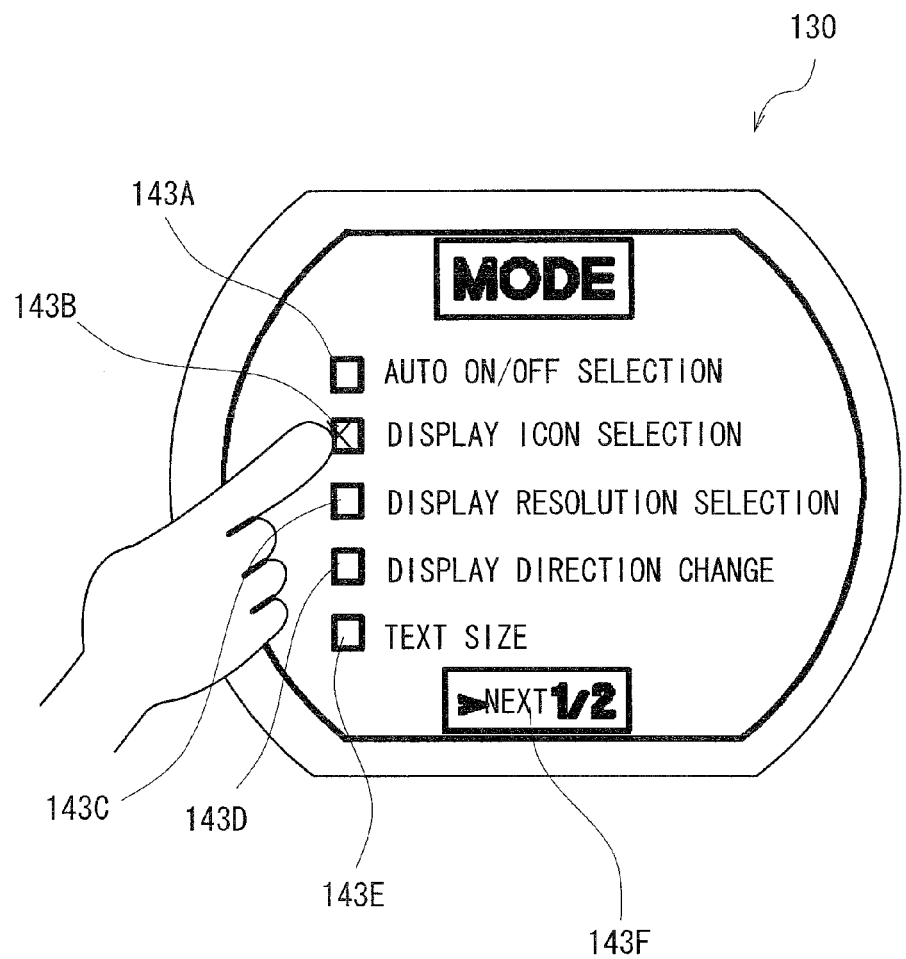
FIG. 4A is a figure for explaining an operation for selecting an icon(s) to be displayed.
Figure 4B:
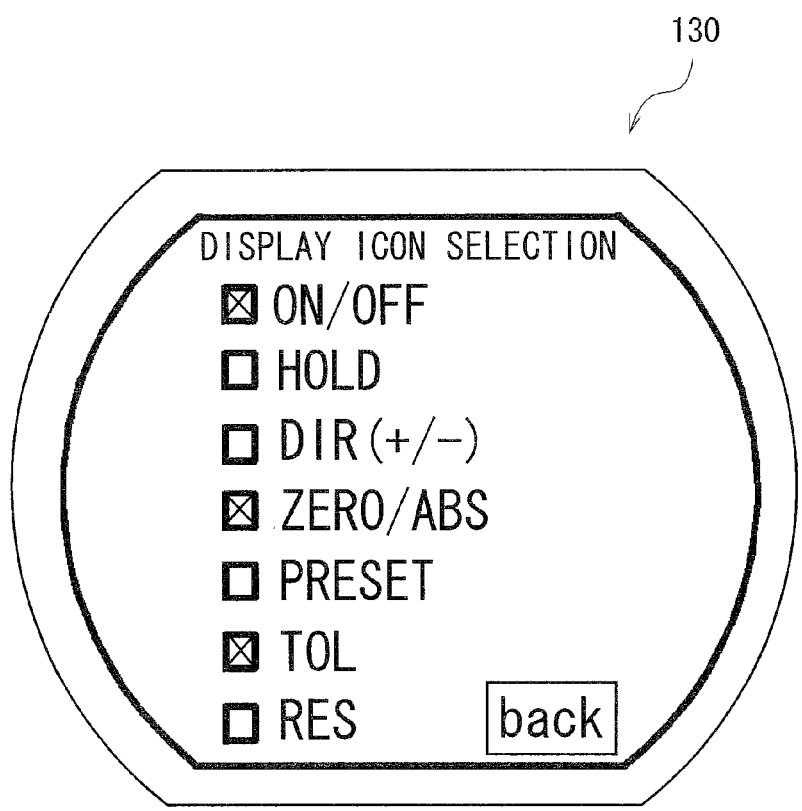
FIG. 4B is a figure for explaining an operation for selecting an icon(s) to be displayed.
Figure 4C:
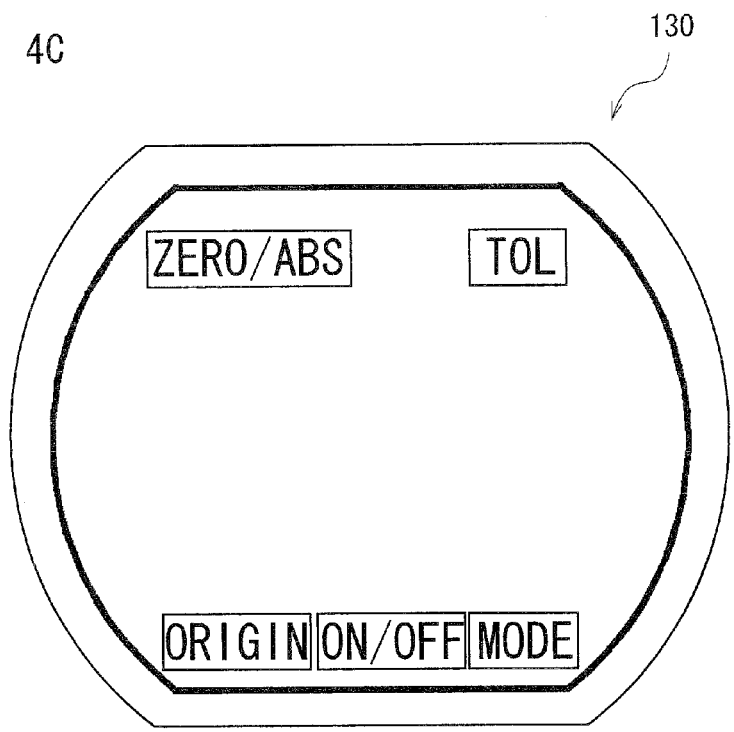
FIG. 4C is a figure for explaining an operation for selecting an icon(s) to be displayed.

In such cases, "Display icon selection" 143B is touched in the mode select menu screen as shown in FIG. 4A. As a result, the display screen changes to a menu screen for selecting icons to be displayed as shown in FIG. 4B. In this state, icons that the user wants to display are selected and touched. As a result, the selected icons can be displayed in the main display screen as shown in FIG. 4C.

(Measurement Jig Selecting Operation)

Further, it is also possible to carry out measurement for various workpieces (objects to be measured) by attaching various attachments (measurement jigs) 150A, 150B, 150C and 150D to the dial gauge 100.

Figure 5A:
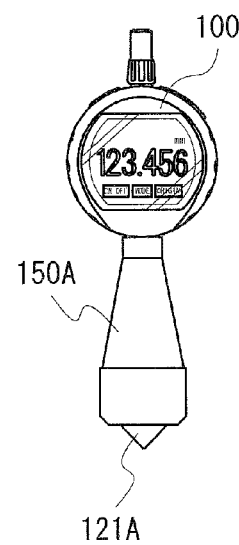
FIG. 5A shows a state where a measurement jig is attached to a dial gauge.
Figure 5B:
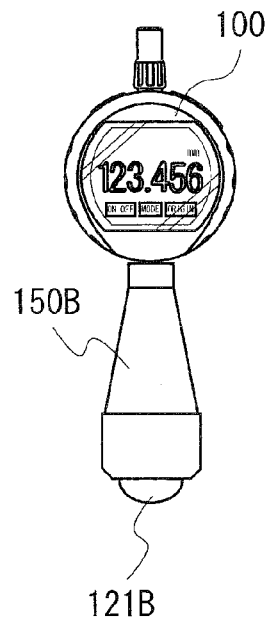
FIG. 5B shows a state where a measurement jig is attached to a dial gauge.
Figure 6A:
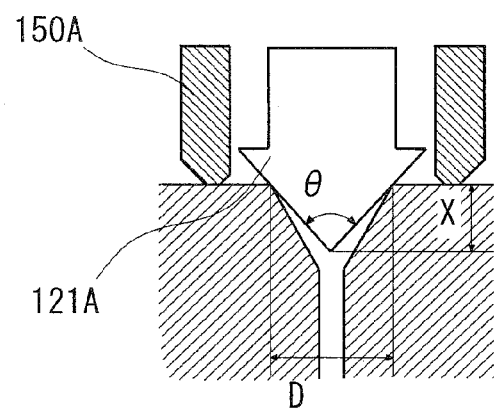
FIG. 6A shows an aspect where a workpiece is measured by using a measurement jig.
Figure 6B:
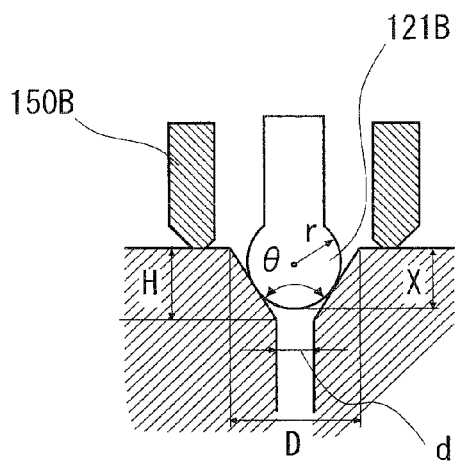
FIG. 6B shows an aspect where a workpiece is measured by using a measurement jig.

Several examples are explained hereinafter. For example, the dial gauge 100 can be used as a feeler gauge. In a measurement jig 150 shown in FIG. 5A, the gauge head 121A has a conical shape. Further, in FIG. 5B, the gauge head 121B is a sphere. By using a gauge head like the gauge head 121A or 121B, it is possible to measure, for example, a rivet hole as shown in FIGS. 6A and 6B. By converting a measured quantity X obtained by the dial gauge 100 by using a predetermined arithmetic expression(s), it is possible to obtain a mouth diameter D or a countersink depth H.

Alternatively, the dial gauge 100 can be used as a Roll diameter measurement tool.

Figure 5C:
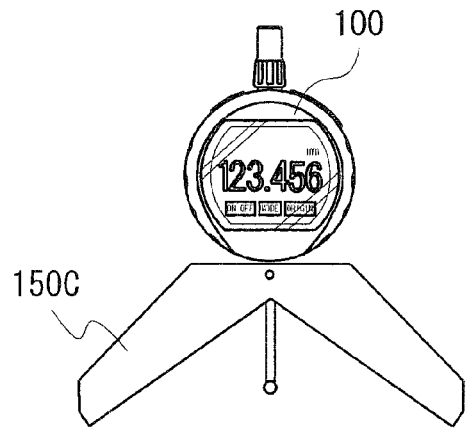
FIG. 5C shows a state where a measurement jig is attached to a dial gauge.
Figure 5D:
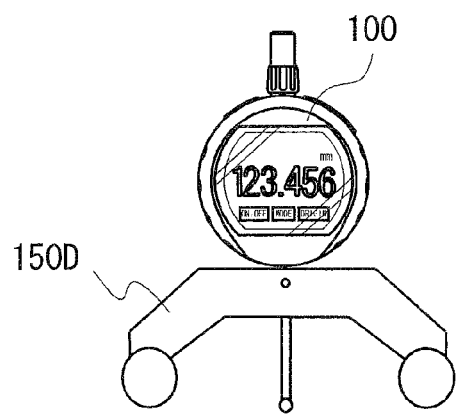
FIG. 5D shows a state where a measurement jig is attached to a dial gauge.
Figure 6C:
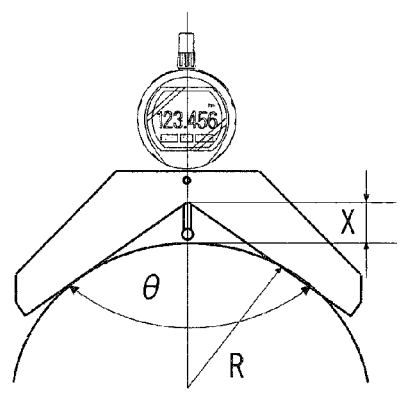
FIG. 6C shows an aspect where a workpiece is measured by using a measurement jig.
Figure 6D:
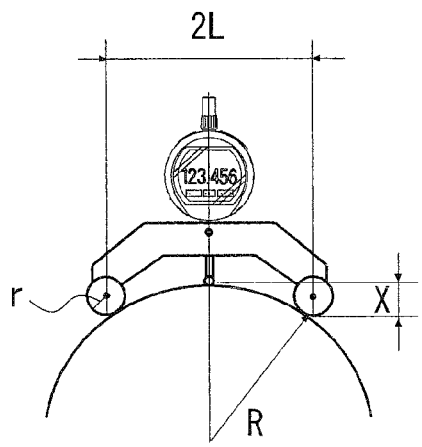
FIG. 6D shows an aspect where a workpiece is measured by using a measurement jig.
Figure 6E:
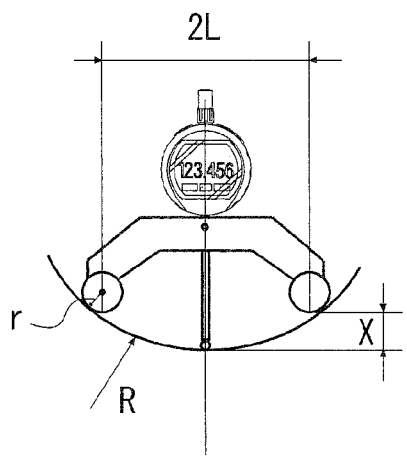
FIG. 6E shows an aspect where a workpiece is measured by using a measurement jig.

A measurement jig 150C shown in FIG. 5C is forked into two sections whose inner surfaces are in the form of a straight line. Further, in a measurement jig 150D shown in FIG. 5D, each contact head is a sphere that comes into contact with a workpiece. By using a measurement jig like the measurement jig 150C or 150D, it is possible to measure, for example, a workpiece having a curvature as shown in FIGS. 6C, 6D and 6E. By converting a measured quantity X obtained by the dial gauge 100 by using a predetermined arithmetic expression(s), it is possible to obtain a curvature radius R of a workpiece.

It should be noted as shown in FIG. 7, arithmetic expressions (1) to (6) corresponding to respective measurement jigs 150A to 150D are prepared and coefficients A, B and C are defined for each of the arithmetic expressions (1) to (6). Therefore, when the measurement jigs 150A to 150D are changed from one to another, it is necessary to enter the setting about which of the measurement jigs 150A to 150D is used into the dial gauge 100.

On the other hand, just by setting the type of the used measurement jig 150A to 150D into the dial gauge 100, conversion calculation is automatically performed by the arithmetic function of the dial gauge 100.

As a result, a mouth diameter D, a countersink depth H, or a curvature radius R is displayed as a converted value in the touch panel display unit 130.

Therefore, users are freed from the troublesome task of obtaining the mouth diameter D, the countersink depth H, or the curvature radius R by converting the measured value by themselves.

Figure 8A:
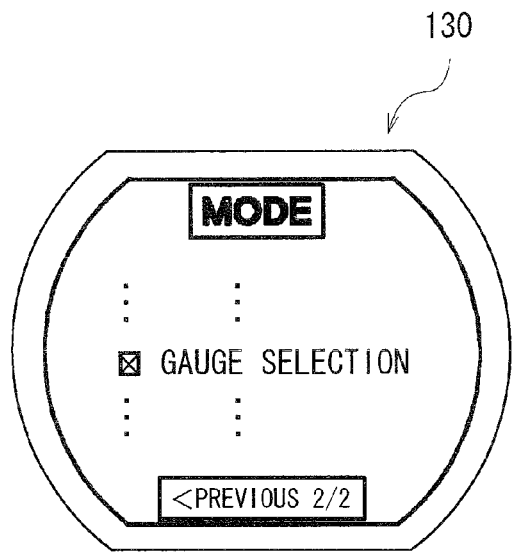
FIG. 8A is a figure for explaining a selecting operation of a measurement jig.
Figure 8B:
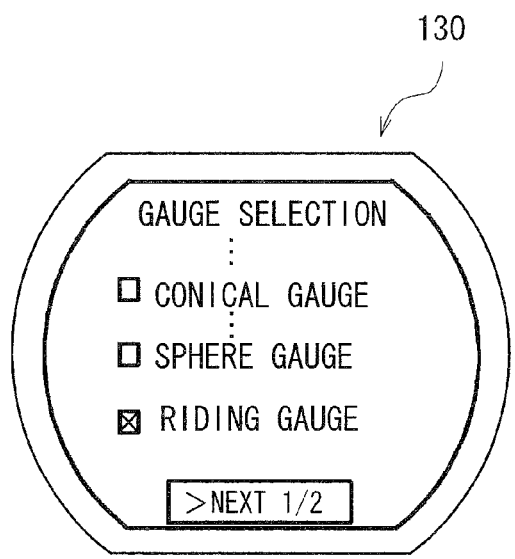
FIG. 8B is a figure for explaining a selecting operation of a measurement jig.
Figure 8C:
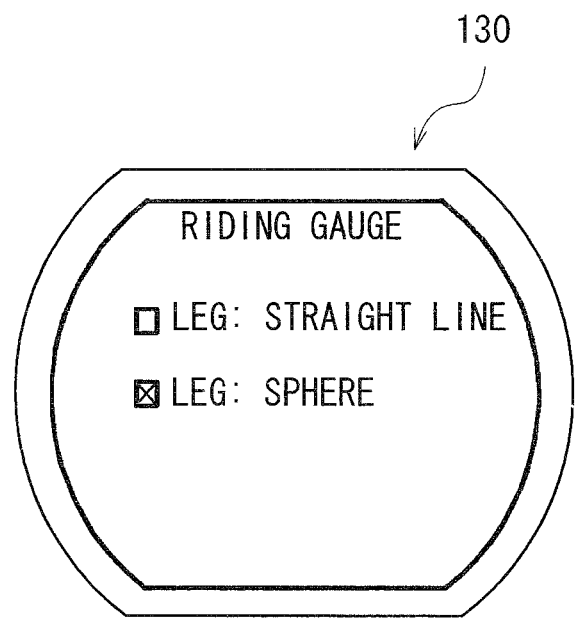
FIG. 8C is a figure for explaining a selecting operation of a measurement jig.

To select the type of the used measurement jig 150A to 150D, "Gauge select menu" is selected from the mode select menu shown in FIG. 8A. Then, when the roll diameter gauge 150D with spheres shown in FIG. 5D is selected, " roll diameter gauge " is selected in FIG. 8B. Then, a gauge whose legs are spheres is selected as shown in FIG. 8C.

In this way, it is possible to easily select one of the measurement jigs 150A to 150D that the user wants to use from the displayed menu(s).

According to this first exemplary embodiment, the following advantageous effects can be obtained.

(1) It becomes possible to eliminate any mechanical push buttons by adopting the touch panel display unit 130. As a result, it is possible to obtain advantageous effects including reducing the thickness, reducing the number of components, and reducing the weight. For example, there is no need to secure the space for the travel of push buttons, and thus making it possible to reduce the thickness of the housing unit 110 by an amount equivalent to the travel of push buttons. As a small tool that is used in a hand-held state, the reduction in the thickness, the size, and/or the weight directly leads to the improvement in the sense of use.

(2) Since the mechanical push buttons are eliminated by adopting the touch panel display unit 130, it is possible to increase the airtight property. That is, there is no need to dispose any holes for mounting push buttons on the front plate 111. As a result, it is possible to have a dust-proof structure and/or a water-proof structure. Therefore, it is possible to exhibit excellent advantageous effects in terms of the durability and the reliability even for use in hostile environments.

(3) Since the touch panel display unit 130 occupies the most part of the front plate 111, the display size is increased and the viewability is thereby improved. By displaying a measurement value in a large size, the misreading of numerical values is prevented. Further, by increasing the display size, it becomes possible to display various necessary information items as well as the measurement result at the same time. Therefore, even when the measurement function becomes more sophisticated and/or more complicated, it is still possible to provide user-friendly measuring instruments.

(4) The operability is significantly improved by adopting the touch panel display unit 130. Various parts/places can be measured by attaching various measurement jigs 150A to 150D to the dial gauge 100. However, if the user needs to convert measured values one by one, the measurement operation becomes very troublesome. It has been possible to perform such calculation by using an arithmetic circuit provided inside the dial gauge 100. However, it has been a troublesome operation because the user needs to set which jig is used and which arithmetic expression should be used by using a small number of push buttons.

In contrast to this, in this exemplary embodiment according to the present invention, it is possible to perform an input operation by using the touch panel display unit 130. Therefore, users can perform an input operation with ease in an intuitive fashion just by successively changing the screens and successively selecting the items by touch operations.

This exemplary embodiment can achieve significantly excellent operability in comparison to the conventional technique in which the user reads an instruction manual meticulously and enters setting through a complicated procedure as describe above, and thus making it possible to make the measurement operation easier and faster.

(5) Further, it is possible to add functions concerning the viewability and the usability such as a function of changing the display direction from the vertical direction to the horizontal direction.

Such functions including changing the display direction are important in terms of the usability.

However, since the display unit of convention measuring instruments uses a plurality of seven-segment display elements that are lined up according to the number of digits, it has been impossible to change the display direction except for turning them upside down.

In contrast to this, since this exemplary embodiment according to the present invention adopts the touch panel display unit, it is possible to change the display direction as well as the displayed content with perfect freedom by using a dot-matrix display technique.

Further, since the push buttons are removed and the size of the touch panel display unit is thereby increased by an amount equivalent to the push buttons, it is possible to display letters and/or numerical values in an eye-friendly manner regardless of whether they are displayed in the vertical direction or in the horizontal direction.

Further, since operations are easily performed by using the touch panel display unit 130, the setting operations such as changing the display direction can be performed with ease.

MODIFIED EXAMPLE 1

A solar panel may be further incorporated into the above-described exemplary embodiment according to the present invention for solar photovoltaic power generation.

Figure 9:
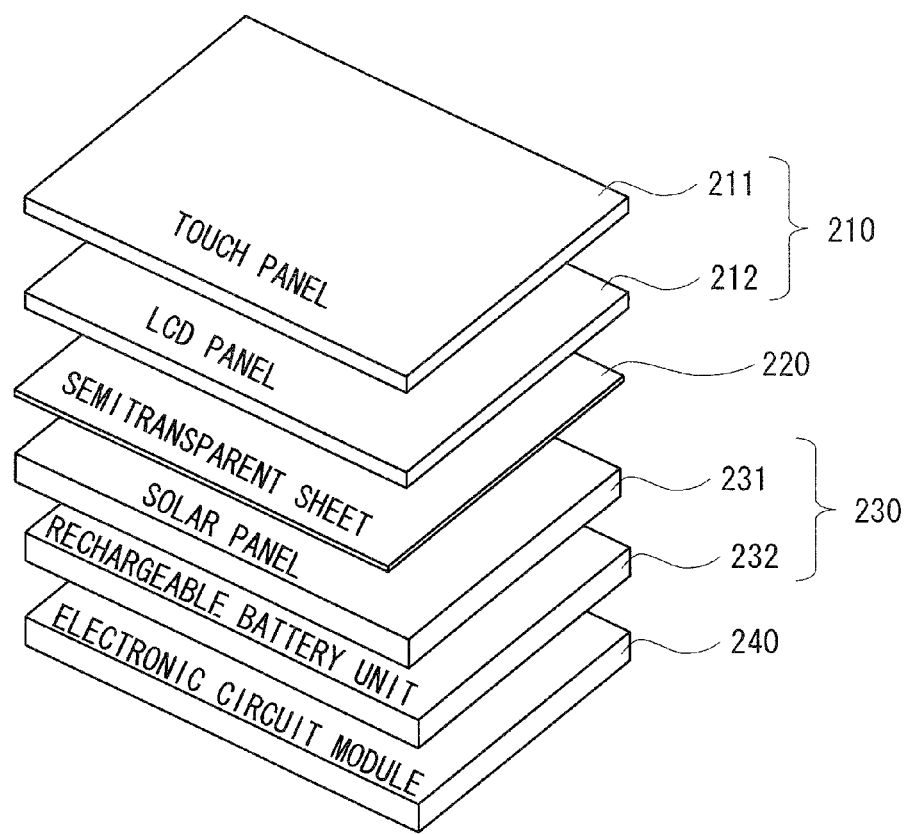
FIG. 9 shows a laminated structure of modules as a modified example 1.

FIG. 9 is a figure schematically showing a laminated structure of modules. From the top, a touch panel display unit 210, a semitransparent reflective sheet 220, a solar photovoltaic unit 230, and an electronic circuit module 240 are stacked.

Note that although the touch panel display unit 210 is composed of a touch panel 211 and a liquid crystal display panel 212 in the figure, other display devices such as an organic EL panel may be used instead of the liquid crystal display panel 212.

The semitransparent reflective sheet 220 may be omitted. That is, the semitransparent reflective sheet 220 may be used as appropriate depending on the type of the display device and/or the viewability of the display.

Further, the solar photovoltaic unit 230 is composed of a solar panel (solar cell(s)) 231 that is used as an electric generator and a rechargeable battery unit 232. However, the rechargeable battery unit 232 does not necessarily have to be disposed behind the solar panel 231. That is, the place of the rechargeable battery may be freely selected.

As described above, the solar panel 231 is disposed on the rear side of the touch panel display unit 210.

Note that as already described with the first exemplary embodiment, by adopting the touch panel display unit 210, it is possible to remove the push buttons and thereby to increase the size of the touch panel display unit 210. Therefore, it is also possible to significantly increase the size of the light-receiving surface of the solar panel disposed behind the touch panel display unit. That is, by using the touch panel display unit 210 and the solar panel 231 in a combined fashion, it is possible to improve the electric generating function in addition to the viewability.

Although there is a possibility that the power consumption could increase in comparison to the conventional measuring instrument due to the use of the touch panel display unit 210, it is possible to supplement the power supply for the increased power consumption by the solar photovoltaic power generation.

Since small tools are required to be small and light-weight, there are limitations on the size/weight of the battery incorporated into them.

In contrast to this, it can be safely said that the combination of the touch panel display unit 210 and the solar panel 231 produces significant advantageous effects for use in small tools.

Note that although an example in which the solar panel 231 is disposed behind the touch panel display unit 210 is explained above, the solar cell(s) may be disposed on the front side of the touch panel display unit. As long as the solar cell(s) is transparent and does not interfere with the touch input operation, the solar cell(s) may be disposed over a wide range on the exterior surface of the measuring instrument, including the area of the touch panel display unit.

When a plurality of push buttons are disposed as in the case of conventional measuring instruments, it is difficult, in the manufacturing process, to dispose a solar cell(s) over a wide range on the exterior surface of the housing unit.

In contrast to this, when the exterior surface is a flat surface as in the case of the touch panel display unit, it is possible to dispose a solar cell(s) on the exterior surface. Further, in this way, it is possible to increase the electric power generated by the solar cell(s).

MODIFIED EXAMPLE 2

The dial gauge 100 is used as an example in the above-described first exemplary embodiment according to the present invention. However, examples of the small tool include a micrometer and a vernier caliper, and the touch panel display unit can be applied to these small tools.

Figure 10:
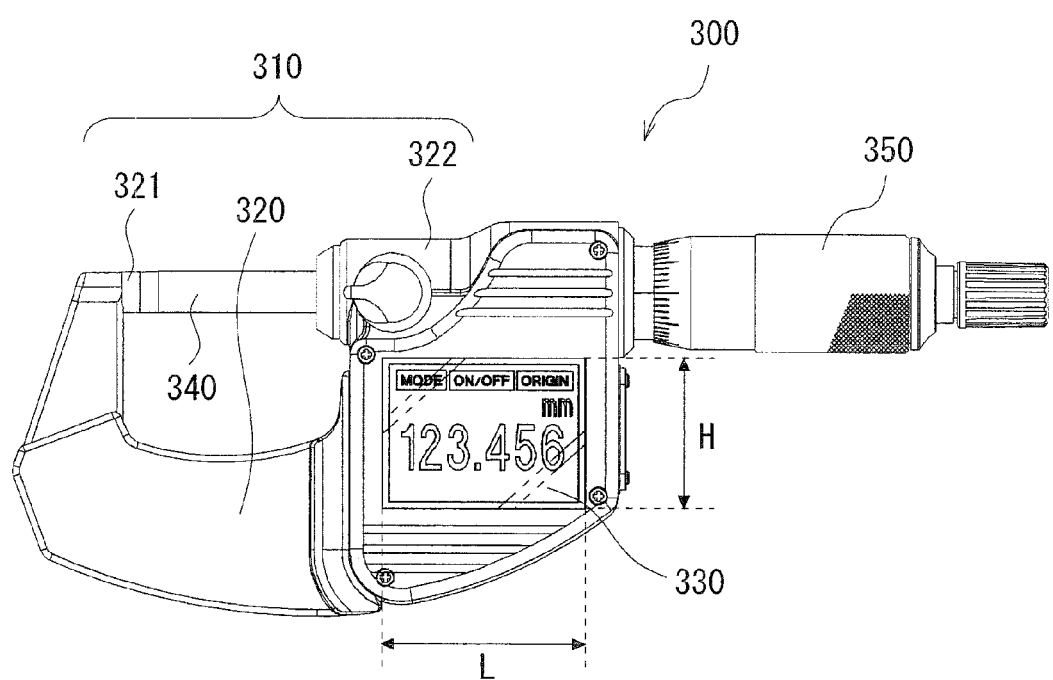
FIG. 10 shows a micro meter as a measuring instrument.

FIG. 10 shows an example of a micrometer 300 including a touch panel display unit 330.

The micrometer 300 includes a main-body frame 310, a spindle 340, and a thimble 350.

The main-body frame 310 includes a U-shaped arm section 320, an anvil 321, a sleeve 322, and a touch panel display unit 330.

The anvil 321 is disposed at one end of the U-shaped arm section 320 and the sleeve 322 is disposed at the other end of the U-shaped arm section 320. The spindle 340 is screwed into the sleeve 322 (screw is not shown) and can be moved forward/backward in the axis direction by rotating it. When the spindle 340 fully protrudes from the sleeve 322, the spindle 340 comes into contact with the anvil 321. Therefore, it is possible to measure the thickness and/or the width of a workpiece by placing the workpiece between the spindle 340 and the anvil 321. The thimble 350 is mounted to the main-body frame 310 in such a manner that the thimble 350 can rotate outside the main-body frame 310. Further, the thimble 350 rotates integrally with the spindle 340.

Further, the touch panel display unit 330 is disposed on the exterior surface of the main-body frame 310.

When the thimble 350 is rotated, the spindle 340 rotates and the spindle 340 thereby moves forward/backward with respect to the anvil 321. The amount of forward/backward movement of the spindle 340 is displayed on the touch panel display unit 330.

In this micrometer 300, it is also possible to remove the mechanical push buttons by adopting the touch panel display unit 330 and thereby to secure a large display area for the touch panel display unit 330.

Specifically, the touch panel display unit 330 is disposed on the side of the other end of the U-shaped arm section 320.

Further, a long horizontal width L is secured for the touch panel display unit 330 by making the best use of the length of the sleeve 322.

Further, a long vertical height H is secured for the touch panel display unit 330 by using the depth of the valley section of the U-shape on the side of the other end of the U-shaped arm section 320.

Further, since no push button is provided in the main-body frame 310, it is possible to increase the size of the touch panel display unit 330 as much as possible.

Figure 11:
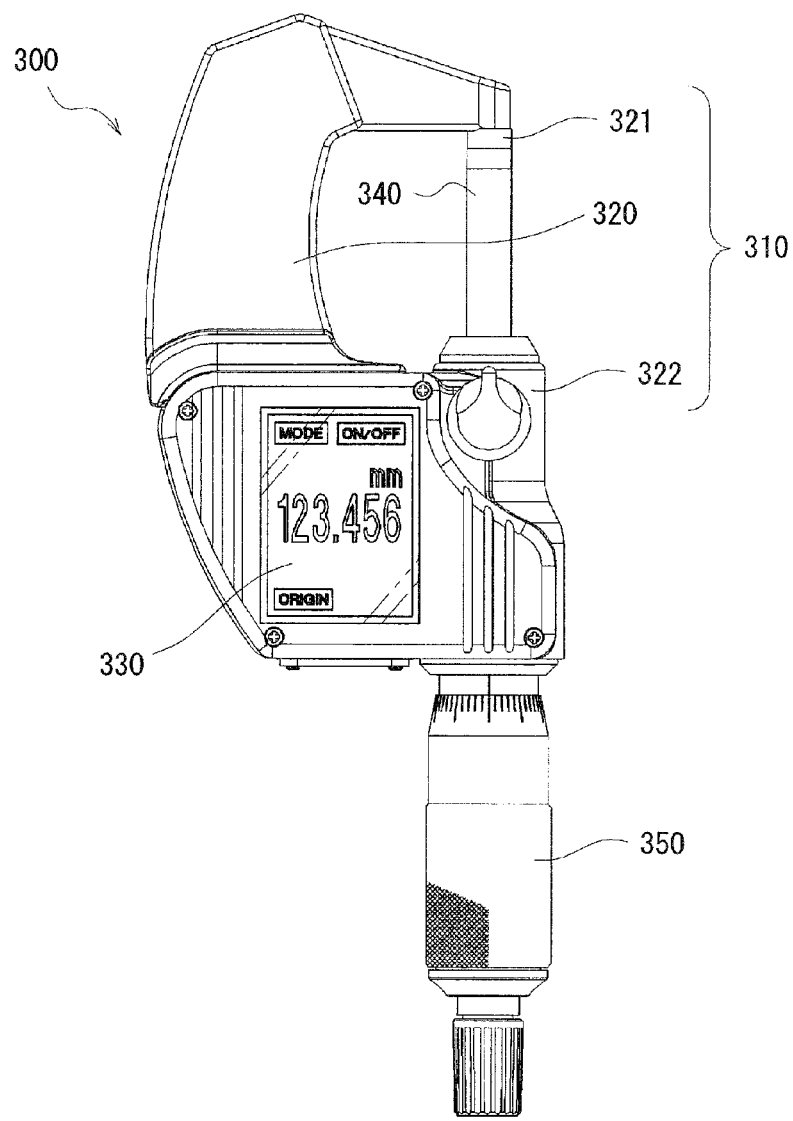
FIG. 11 shows a state where the display direction of the micro meter is changed.

Further, when the micrometer 300 is used, it is desirable that the micrometer 300 can be used in various directions including the vertical direction and the horizontal direction (see FIG. 11). In such cases, the operation for changing the display direction can be easily performed in a similar manner to that of the above-described first exemplary embodiment.

Figure 12:
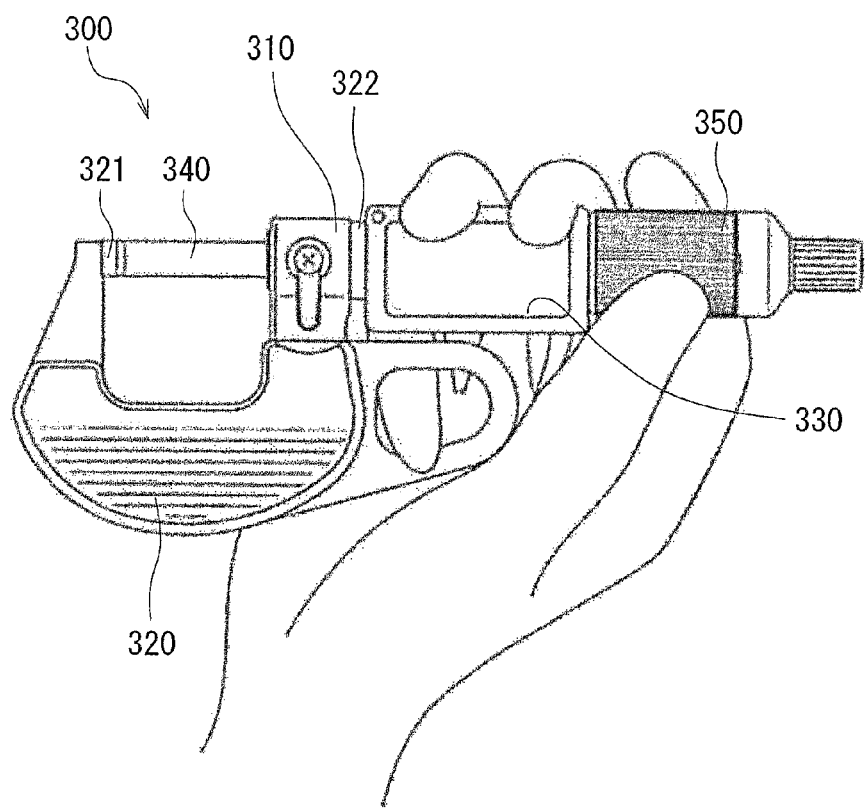
FIG. 12 shows a state where a micro meter is used by a right hand.
Figure 13:
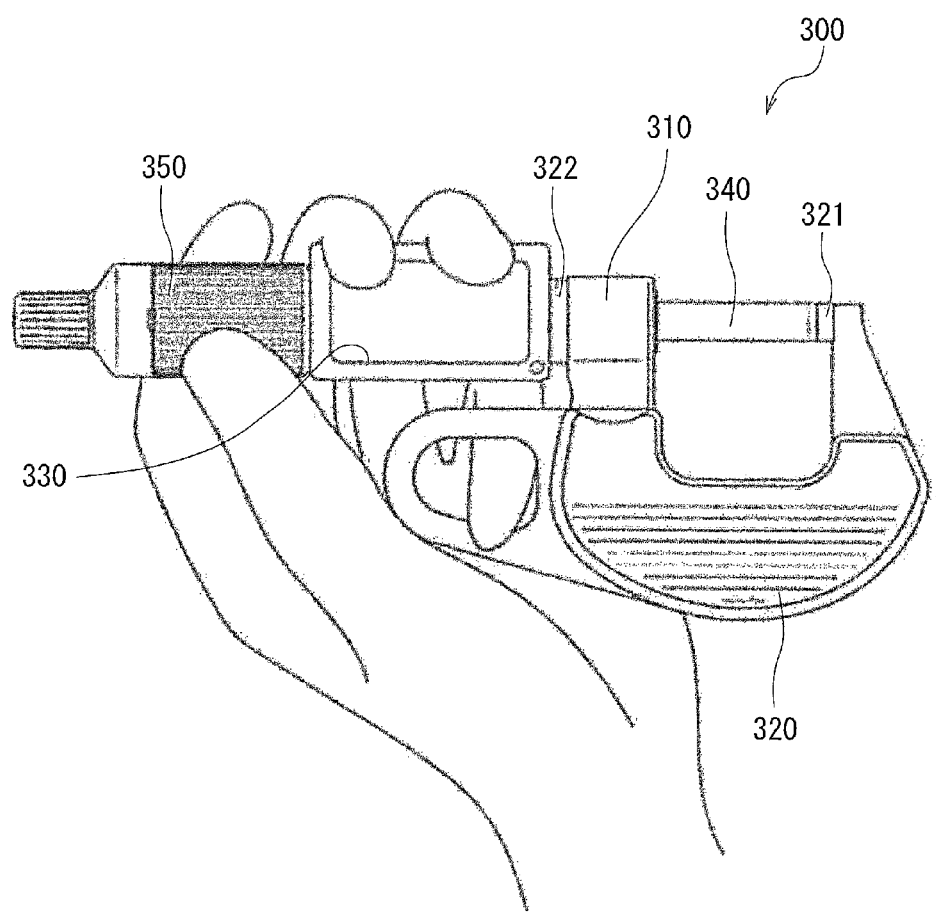
FIG. 13 shows a state where a micro meter is used by a left hand.

Further, there are situations where the user wants to use the micrometer 300 by his/her right hand as shown in FIG. 12 and situations where the user wants to use the micrometer 300 by his/her left hand as shown in FIG. 13.

Note that the micrometer shown in FIGS. 12 and 13 is different from the one shown in FIGS. 10 and 11 in that the touch panel display unit 330 is disposed on the side of the sleeve 322 in the micrometer shown in FIGS. 12 and 13.

Figure 14:
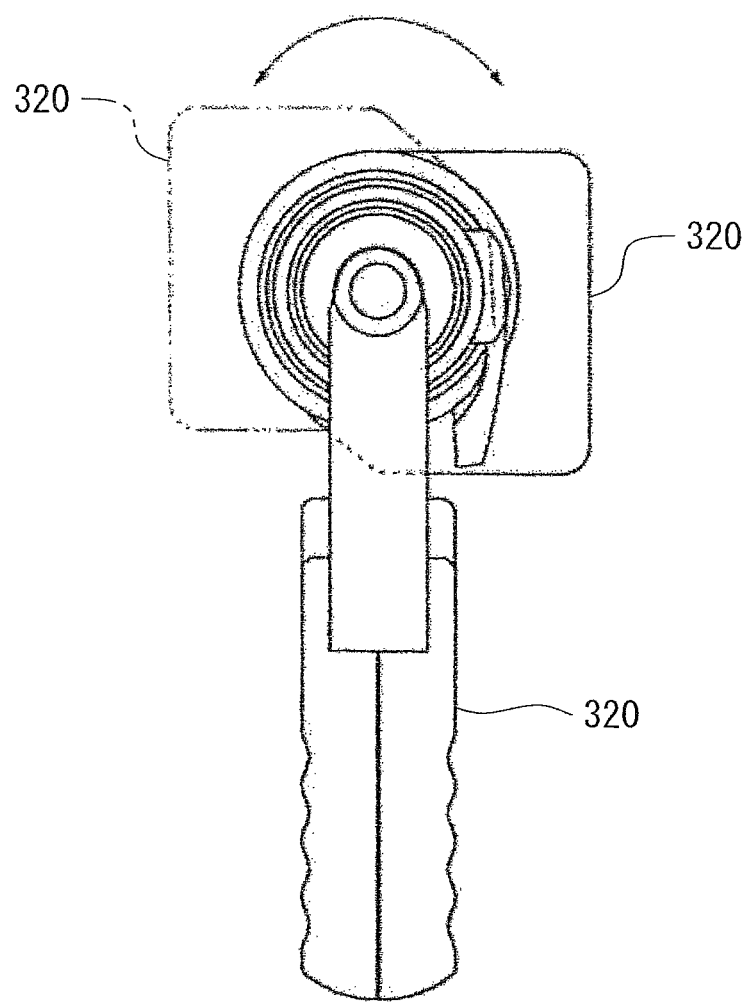
FIG. 14 shows a rotational action of a touch panel unit.

In such cases, the touch panel display unit 330 may be disposed in such a manner that the touch panel display unit 330 can rotate by using the sleeve 322 as the rotation axis as shown in FIG. 14, so that the user can easily view the displayed content regardless of whether the user uses the measuring instrument by his/her right hand (FIG. 12) or his/her left hand (FIG. 13).

It should be noted that the touch panel display unit 330 is turned upside down when the touch panel display unit 330 is rotated by using the sleeve 322 as the rotation axis.

Even in the state like this, the display direction of the touch panel display unit 330 can be easily changed so that the display direction is turned upside down. That is, as explained above with the first exemplary embodiment, the display direction of the touch panel display unit 330 can be easily changed by using an input operation performed on the touch panel display unit 130.

Figure 15:
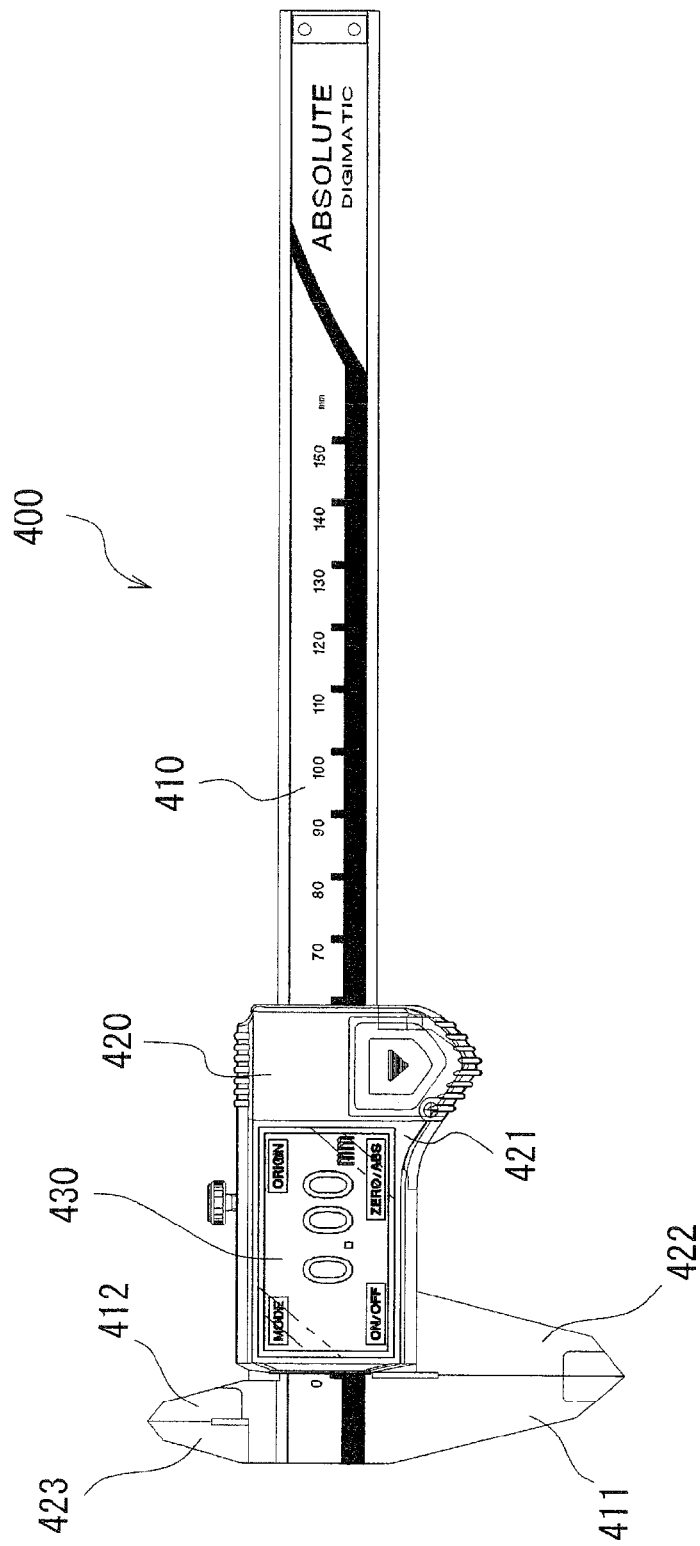
FIG. 15 shows a vernier caliper as a measuring instrument.

Next, FIG. 15 shows an example of a vernier caliper including a touch panel display unit.

As well-known in the field, a vernier caliper 400 includes a main scale 410, a slider 420, and a touch panel display unit 430.

The slider 420 is disposed in the vernier caliper 400 in such a manner that the slider 420 can slide along the longitudinal direction of the main scale 410.

An outer measurement jaw 411 and an inner measurement jaw 412 are provided at one end in the longitudinal direction of the main scale 410.

The slider 420 includes a slider main-body 421 that slides along the main scale 410. Further, an outer measurement jaw 422 and an inner measurement jaw 423 are provided at one end of the slider main-body 421. Further, a touch panel display unit 430 is disposed on the exterior surface of the slider main-body 421. When a workpiece is placed between the measurement jaws 411, 412 of the main scale 410 and the measurement jaws 422, 423 of the slider 420, the movement amount of the slider 420 in that state is displayed on the touch panel display unit 430.

Even in the vernier caliper 400 like this, it is possible to eliminate the mechanical push buttons by adopting the touch panel display unit 430 and thereby to increase the display area of the touch panel display unit 430. Specifically, for the touch panel display unit 430, it is possible to secure an area having such a large size that the touch panel display unit 430 occupies about 80% of the front-side surface of the slider main-body 421.

Even in the micrometer 300 or the vernier caliper 400, which are explained as Modified example 2, it is possible to achieve the same advantageous effects as the advantageous effects (1) to (5) of the first exemplary embodiment by adopting the touch panel display unit 330 or 430.

Further, by taking many types of measuring instruments such as a dial gauge 100, a micrometer 300, and a vernier caliper 400 into consideration, the following advantageous effect can be also obtained.

(6) The use of the touch panel display unit eliminates the need for deliberating on the number and the arrangement of buttons according to the type of the measuring instrument. That is, there is no need for taking account of the difference in the number and the arrangement of buttons even when the type of the measuring instrument is different, i.e., even when the measuring instrument is a dial gauge 100, a micrometer 300, or a vernier caliper 400.

Further, there is no need to add a button(s) regardless of whether the measuring instrument is a high-function measuring instrument in which a variety of measurement items can be selected or a low-function measuring instrument that can be used only for simple measurement. That is, the only thing that needs to be done is to change the internal setting program.

(Note that if any push button(s) is necessary, it may be the power button at the most. Further, even the power button may be unnecessary when the measuring instrument is configured so that the measuring instrument is automatically turned off by a certain operation (e.g., by moving the spindle).)

Further, provided that the intended measuring instruments are small tools, the sizes of measuring instruments are categorized into a small number of groups even when they include various types of measuring instruments. Therefore, the sizes of the display units are also categorized into a small number of groups.

Under the assumption like this, the use of the touch panel display unit makes it possible to standardize the components, i.e., the touch panel display units over various functions and various types of measuring instruments including dial gauges 100, micrometers 300, and vernier calipers 400.

When the touch panel display units are standardized over a plurality of types of measuring instruments as described above, it is possible to reduce the types of components and thereby to reduce the manufacturing cost and the assembling cost.

This becomes a significant advantage when a wide range of measuring instruments over various functions and various types are manufactured.

Further, the merit that components can be standardized becomes more significant when the maintenance such as repair is also taken into account.

[Second Exemplary Embodiment]

Next, a second exemplary embodiment according to the present invention is explained hereinafter.

As a second exemplary embodiment, an example of a height gauge is explained.

Figure 16:
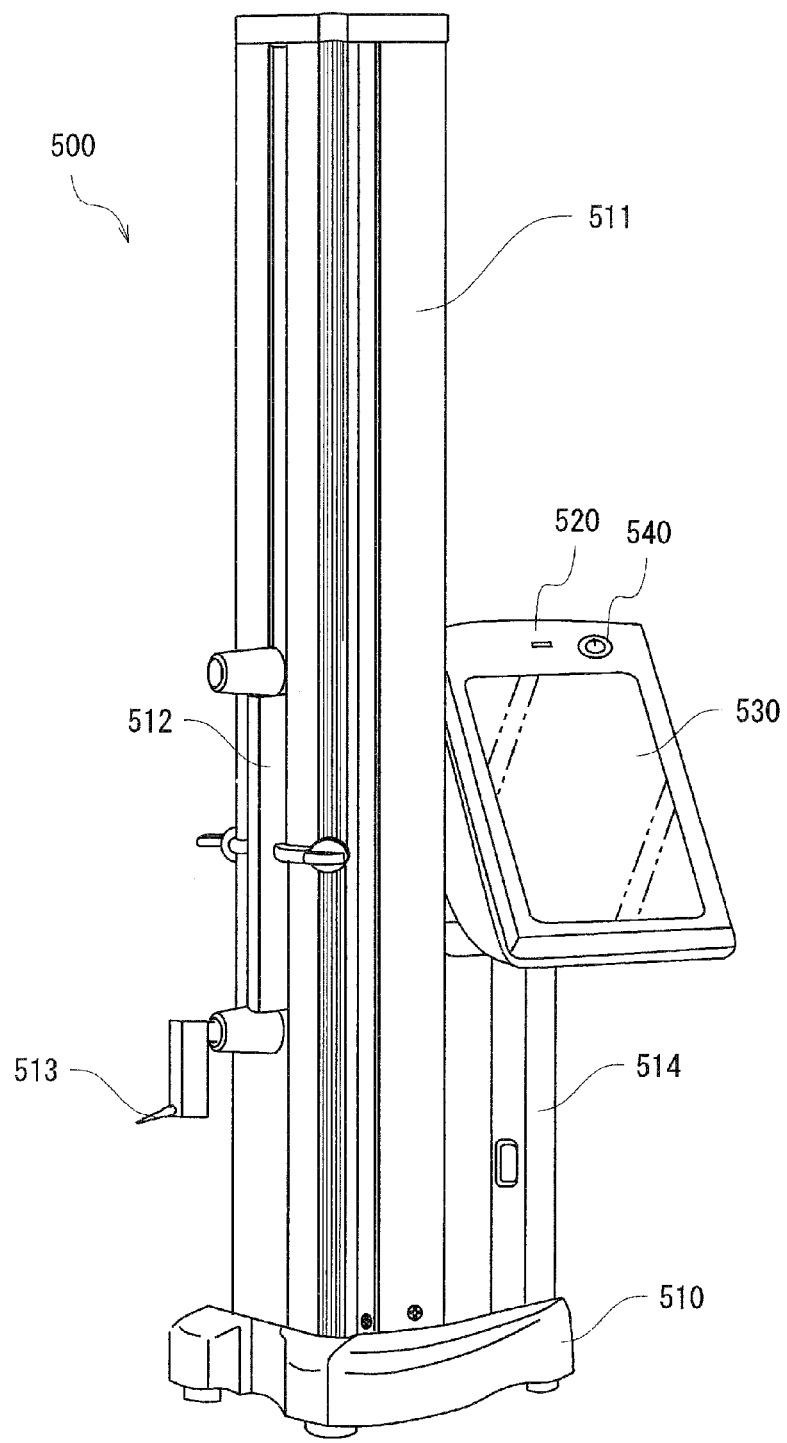
FIG. 16 shows a height gauge as a measuring instrument.

As shown in FIG. 16, a height gauge 500 includes a base 510, a pillar 511, a slider 512, a gauge head 513, a grip section 514, and a display operation unit 520.

In this configuration, the slider 512 is disposed in such a manner that the slider 512 can move upward/downward in the vertical direction along the pillar 511. Further, as the slider 512 moves, the gauge head 513 is moved integrally with the gauge head 513 in the vertical direction.

The display operation unit 520 is disposed on the opposite side of the pillar 511 to the side on which the slider 512 is disposed. Further, the second exemplary embodiment is also characterized in that the entire area of the display surface of the display operation unit 520 serves as a touch panel display unit 530.

Figure 17:
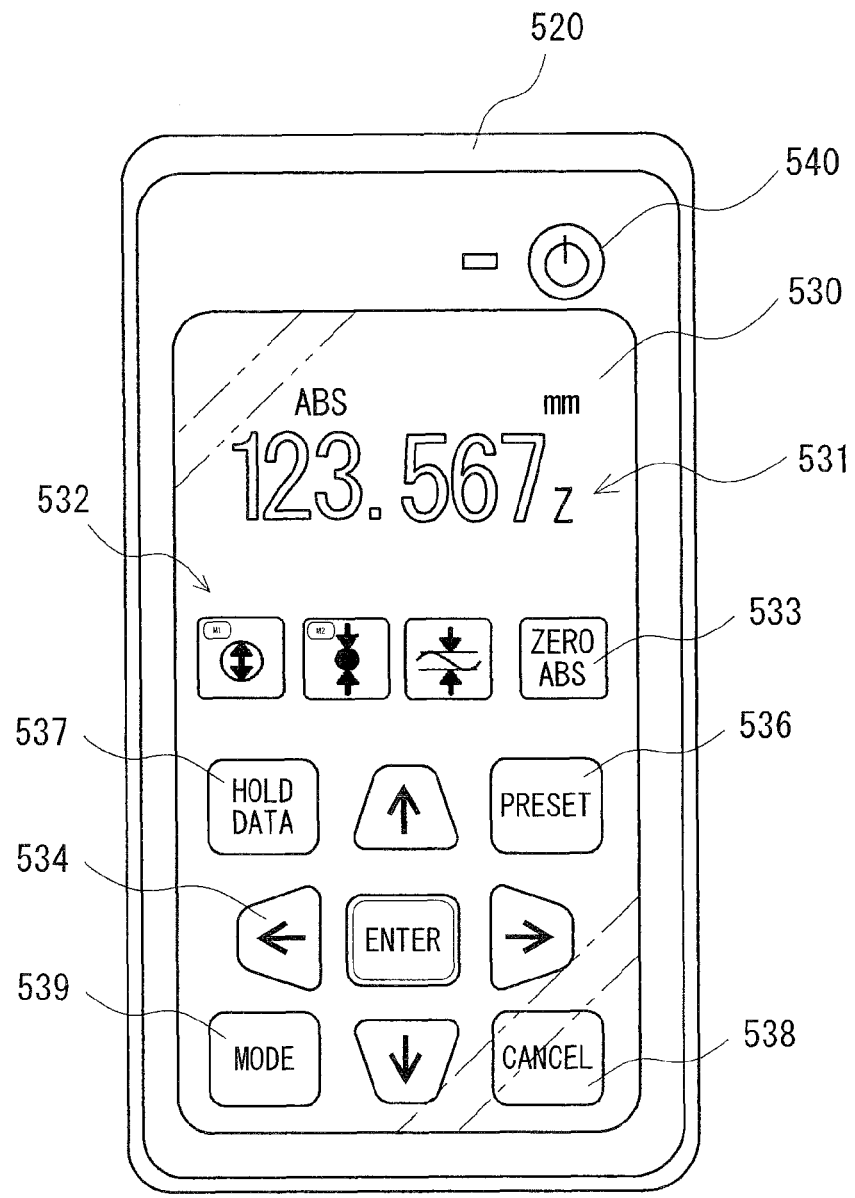
FIG. 17 is a front view of a display operation unit of a height gauge.

FIG. 17 is a front view of the display operation unit 520 and shows an example of its main display screen.

As viewed from the front, about 80% of the display operation unit 520 serves as the touch panel display unit 530. Since input operations are performed by touching the touch panel display unit 530, no push button is provided for input operations. (However, a power button 540 is a push button.)

The arrangement of displayed items on the main display screen is briefly explained hereinafter.

On the main display screen, the upper half is an area that is used to clearly display a numerical value(s) 531 such as a measurement result.

Further, in the lower half, icons that are used to enter commands used for measurement operations are arranged.

In the middle section, three icons 532 representing measurement items and an icon 533 for zero-setting are arranged. Further, in the bottom section, various icons for various functions including a vertical/horizontal operation 534, an entering 535, a presetting 536, a data holding 537, a canceling 538, and a mode selection 539 are arranged.

(Measurement Jig/Measurement Item Selection Operation)

It is possible to carry out measurement for various workpieces (objects to be measured) by attaching various attachments (measurement jigs) to the height gauge 500.

Figure 18:
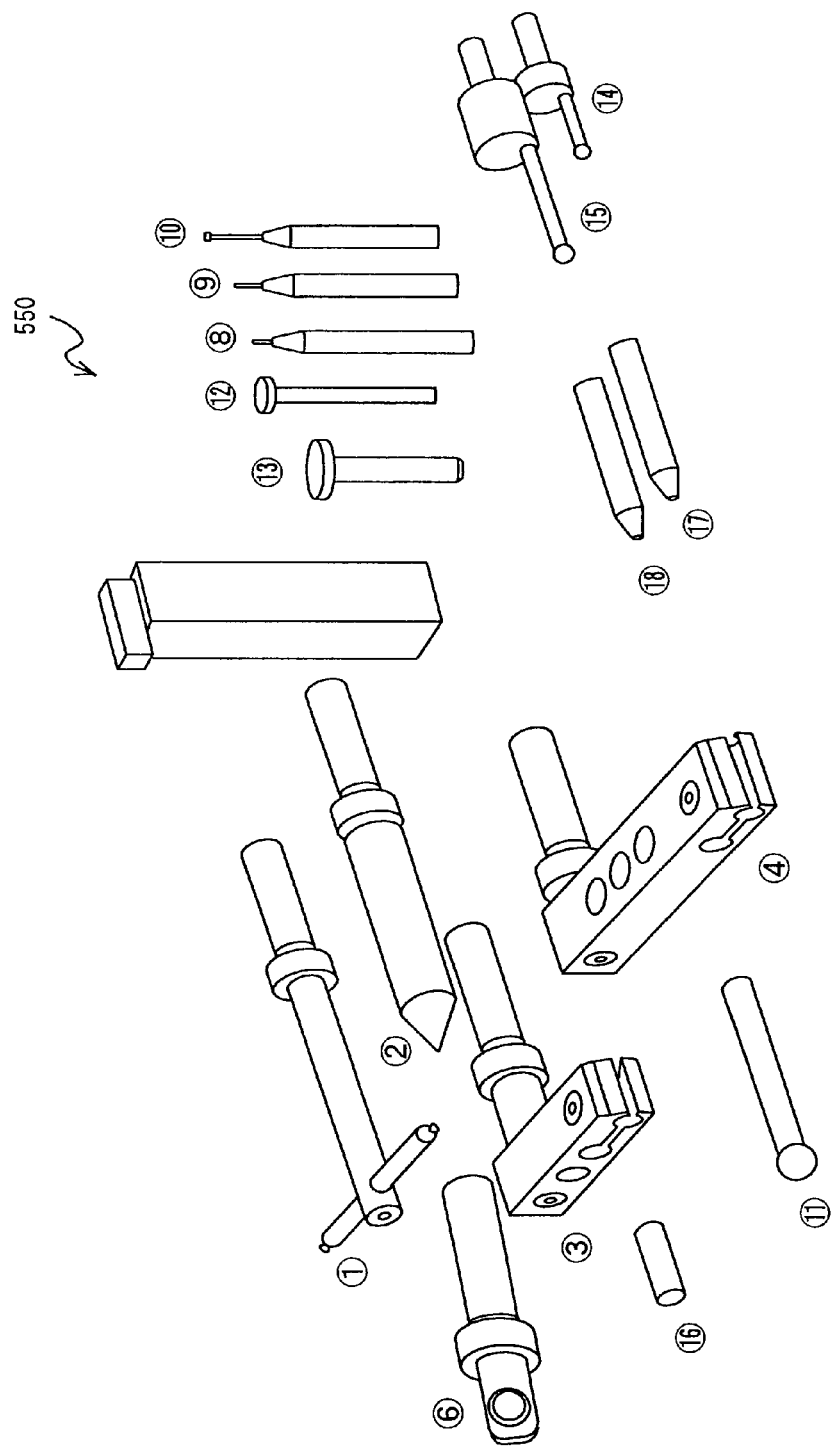
FIG. 18 shows examples of various types of measurement jigs.

FIG. 18 shows examples of various types of measurement jigs 550.

Since some measurement jigs may be eccentric and/or the radius of the contact sphere may be different depending on the measurement jig 550, it is necessary to set the type of measurement jig 550 to be used in the height gauge 500.

Even in the case like this and even when the number of types of the measurement jigs 550 is very large, it is possible to easily select the measurement jig through the gauge select menu screen as explained above with the first exemplary embodiment.

Figure 19:
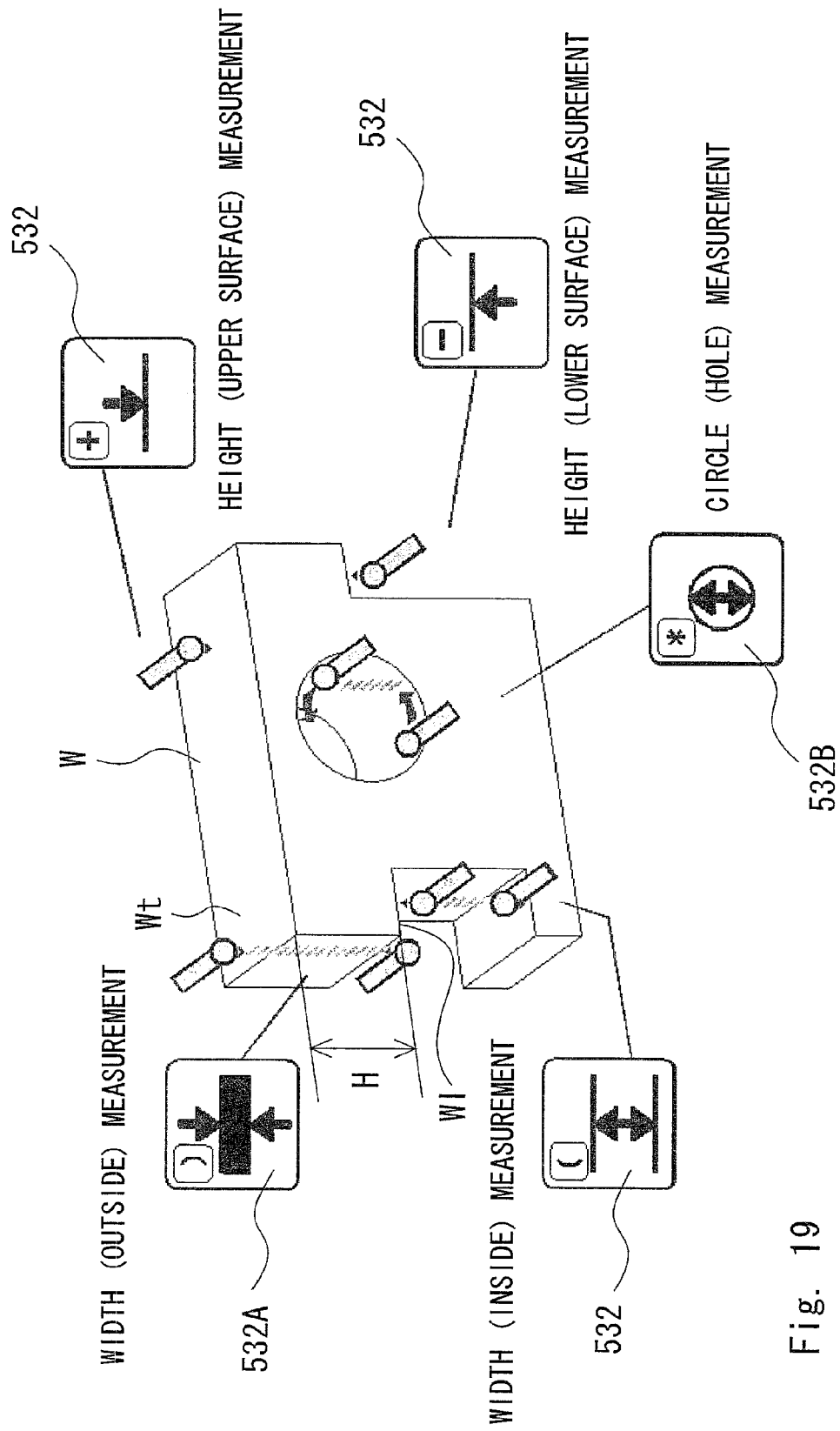
FIG. 19 shows various measurement items.

Further, FIG. 19 shows an example of various measurement items. For example, assume that the outer width of a workpiece W is to be measured. In this case, a difference H between the height of the outer upper surface Wt and the height of the outer lower surface W1 is measured. For the measurement like this, a measurement item "Outer width of workpiece" is defined in advance in the height gauge 500. As a result, the difference H between the height of the upper surface Wt and the height of the lower surface W1 is automatically calculated by the internal arithmetic circuit and the result is displayed in the main display screen.

Therefore, the user may need to perform a setting operation for a measurement item(s). However, the setting operation like this can be also performed with ease. For example, as shown in FIG. 19, pictograph icons 532 are prepared in advance so that the types (or details) of measurements can be understood at first glance. For example, as shown as an icon 532A, a line is sandwiched by upward/downward arrows. In this way, users can intuitively recognize that what is measured is an outer width. Further, as shown as an icon 532B, an arrow representing a diameter is disposed inside a circle. In this way, users can intuitively recognize that what is measured is an internal diameter of a hole.

Figure 20:
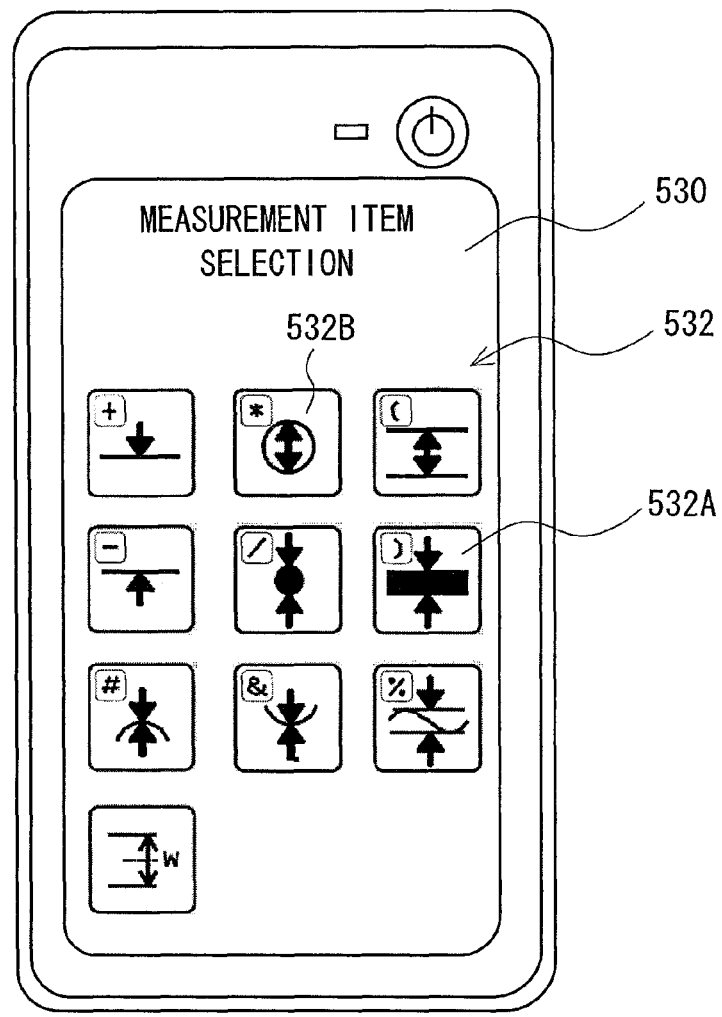
FIG. 20 shows a selection screen of measurement items.

In the measurement item select screen, the pictograph icons 532 representing measurement items are arranged in a row(s) as shown in FIG. 20. A user may select some of the pictograph icons 532 that the user may use in the next measurement or may use frequently by touching them. The icons 532 selected in this manner may be displayed, for example, in the middle section of the main display screen as shown in FIG. 17. Then, in an actual measurement operation, the user may select and touch the pictograph icon 532 corresponding to the measurement item.

Since the display operation unit 520 is composed of a touch panel as described above, users can intuitively use various functions with ease and efficiency even when the number of types of functions is large and/or the functions are complicated. In particular, the operation method in which a user touches pictograph icons is much easier than the troublesome operation method in which a user needs to enter a series of commands.

Note that the present invention is not limited to the above-described exemplary embodiments and various modifications can be made to those exemplary embodiments without departing from the spirit and scope of the present invention.

In the above-described exemplary embodiments and modified examples, examples in which the push buttons can be eliminated by adopting a touch panel display unit are shown. However, it should be noted that, needless to say, a push button(s) may be also provided as required.

Although examples in which a user performs an operation for changing a display direction in order to change the display direction are shown, the measuring instrument may be configured so that the display direction is automatically changed/adjusted in response to detection of the vertical direction.

Furthermore, the display direction is not limited to the vertical/horizontal change and the upside-down change. That is, by using the advantage of the display method using the dot-matrix display technique, the measuring instrument may be configured so that the display direction can be changed to any given directions (angles).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A measuring instrument comprising a touch panel display unit that receives an external input performed by physical contact and includes a display function,
    wherein the touch panel display unit displays a plurality of operation icons that are used to perform a complicated input operation, and also displays a measurement result;
    a plurality of measurement modes are prepared in advance according to a difference of an object to be measured or a difference of a measurement method; and
    the plurality of operation icons are grouped and hierarchized for each of the measurement nodes, and a group of operation icons corresponding to a selected measurement mode are displayed in a mode select menu screen of the touch panel display unit.

2. The measuring instrument according to claim 1, wherein a plurality of measurement modes are prepared in advance according to a difference of an object to be measured or a difference of a measurement method;
    the plurality of operation icons, each corresponding to a respective one of the plurality of measurement modes, are prepared; and
    a choice among the plurality of measurement modes can be made by selecting and touching at least one of the plurality operation icons displayed in the touch panel display unit.

3. The measuring instrument according to claim 1, wherein a direction of a display in the touch panel display unit can be changed according to a direction in which a user uses the measuring instrument.

4. The measuring instrument according to claim 1, wherein a number of mechanical push button switches provided in the measuring instrument is equal to or less than one.

5. The measuring instrument according to claim 1, wherein the measuring instrument does not have any mechanical push button switch.

6. The measuring instrument according to claim 1, further comprising a solar cell.

7. The measuring instrument according to claim 6, wherein the solar cell is disposed on a rear side of the touch panel display unit.

8. The measuring instrument according to claim 6, wherein the solar cell is disposed on a front side of the touch panel display unit.

9. The measuring instrument according to claim 1, wherein the measuring instrument is one of a dial gauge, a vernier caliper, and a micrometer.

10. The measuring instrument according to claim 1, wherein the measuring instrument is a height gauge.

* * * * *